(12) United States Patent
Proudkii et al.

(10) Patent No.: US 8,834,684 B2
(45) Date of Patent: Sep. 16, 2014

(54) METHOD AND APPARATUS FOR EXCITATION OF RESONANCES IN MOLECULES

(75) Inventors: Vassilli P. Proudkii, Edmonton (CA); Kirk McNeil, Edmonton (CA); Joe Michael Yarborough, Tucson, AZ (US)

(73) Assignee: RF Thummin Technologies, Inc. (CA)

( * ) Notice: Subject to any disclaimer, the term of this patent is extended or adjusted under 35 U.S.C. 154(b) by 289 days.

(21) Appl. No.: 13/264,727

(22) PCT Filed: Apr. 13, 2010

(86) PCT No.: PCT/US2010/030930
§ 371 (c)(1),
(2), (4) Date: Dec. 24, 2011

(87) PCT Pub. No.: WO2010/120810
PCT Pub. Date: Oct. 21, 2010

(65) Prior Publication Data
US 2012/0091033 A1    Apr. 19, 2012

Related U.S. Application Data
(60) Provisional application No. 61/169,227, filed on Apr. 14, 2009.

(51) Int. Cl.
| | | |
|---|---|---|
| *C07C 1/00* | (2006.01) | |
| *B01J 19/12* | (2006.01) | |
| *C10G 15/08* | (2006.01) | |

(52) U.S. Cl.
CPC ........ *B01J 19/126* (2013.01); *B01J 2219/0869* (2013.01); *B01J 19/129* (2013.01); *C10G 15/08* (2013.01); *C10G 2300/302* (2013.01); *B01J 2219/0894* (2013.01); *C10G 2300/301* (2013.01)

USPC .............. 204/157.15; 204/157.43; 204/164; 204/168; 204/172; 208/106; 196/46; 196/121

(58) Field of Classification Search
CPC ........ C10G 15/08; C10G 9/24; C07C 1/0495; C07C 4/16; C07C 4/22; H05C 3/00
USPC .............. 204/157.15, 157.43, 164, 168, 172; 208/106; 196/46, 121
See application file for complete search history.

(56) References Cited

U.S. PATENT DOCUMENTS

| | | | |
|---|---|---|---|
| 2,676,257 A | 4/1954 | Hebenstreit | 343/768 |
| 2,714,661 A | 8/1955 | Norton | 331/3 |

(Continued)

FOREIGN PATENT DOCUMENTS

| | | | |
|---|---|---|---|
| JP | 08-165194 | 6/1996 | |
| JP | 08-204265 | 7/1996 | |
| WO | WO 2009/039521 | 3/2009 | B01D 17/06 |

OTHER PUBLICATIONS

Grundmann, M. et al. (2008). Handbook of Self Assembled Semiconductor Nanostructures for Novel Devices in Photonics and Electronics, Elsevier, 864 pgs (Office action cites p. 304).*

(Continued)

*Primary Examiner* — Brian McCaig
(74) *Attorney, Agent, or Firm* — Hayes Soloway P.C.

(57) ABSTRACT

A method is described to excite molecules at their natural resonance frequencies with sufficient energy to break or form chemical bonds using electromagnetic radiation in the radio frequency (RF) and microwave frequency range. Liquid, solid, or gaseous materials are prepared and injected into a resonant structure where they are bombarded with electromagnetic energy in the RF or microwave range at resonant frequencies of the molecules of the materials. Alternatively, electromagnetic energy tuned to dielectric particles prepared from the materials may also be supplied to further enhance the reaction.

26 Claims, 2 Drawing Sheets

(56) References Cited

U.S. PATENT DOCUMENTS

Figure 1:
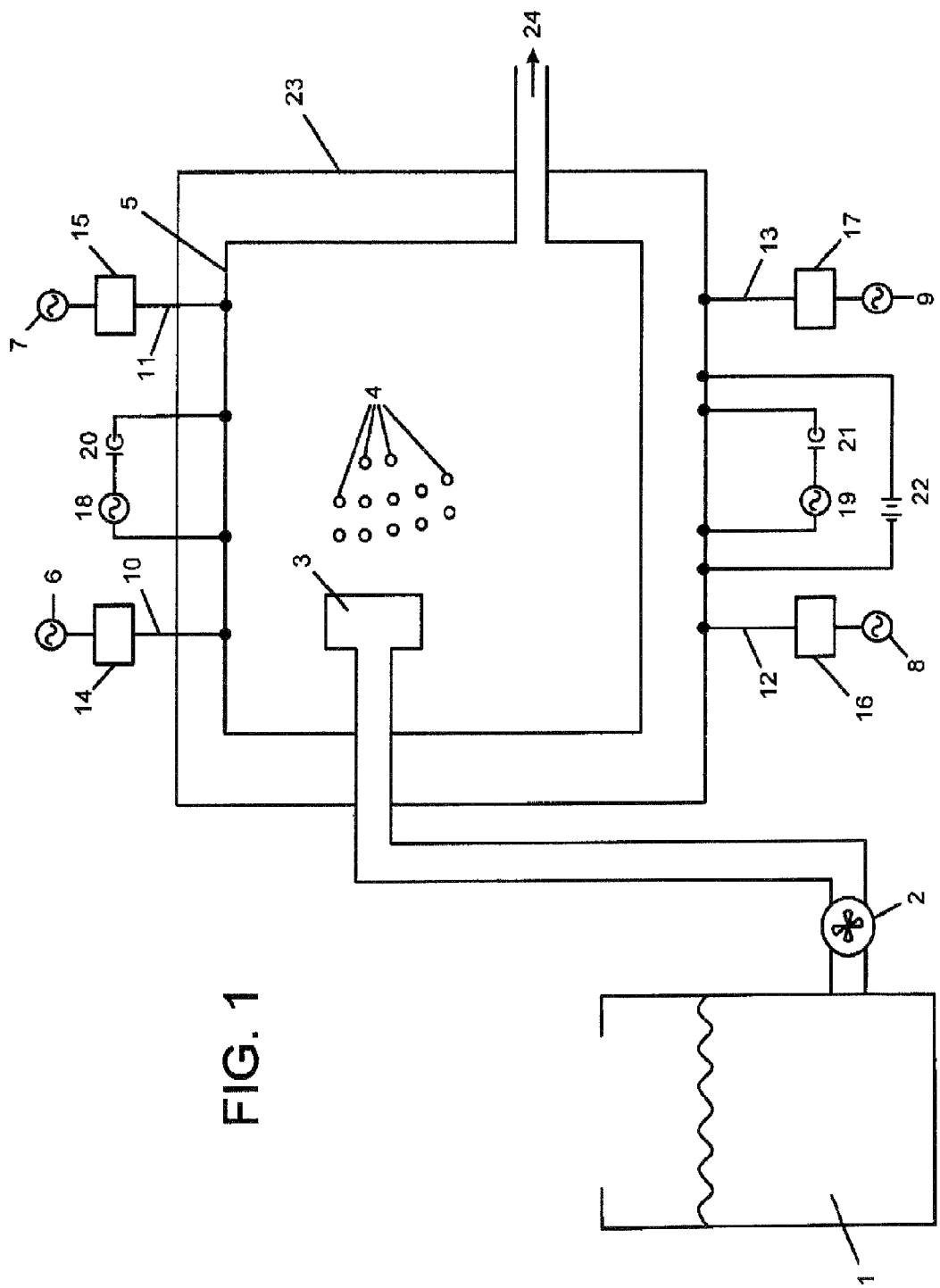

| | | | | |
|---|---|---|---|---|
| 3,170,519 A | 2/1965 | Haagensen | ...................... | 166/60 |
| 3,442,758 A | 5/1969 | Penfold et al. | | |
| 3,588,594 A | 6/1971 | Matsuno et al. | ......... | 315/111.21 |
| 3,882,424 A | 5/1975 | Debois et al. | ................. | 332/127 |
| 4,004,122 A | 1/1977 | Haillier | ......................... | 219/697 |
| 4,153,533 A | 5/1979 | Kirkbirde | ................ | 204/157.15 |
| 4,279,722 A | 7/1981 | Kirkbride | ................ | 204/157.15 |
| 4,309,259 A | 1/1982 | Sarma et al. | .................... | 204/164 |
| 4,336,434 A | 6/1982 | Miller | ......................... | 219/747 |
| 4,435,260 A | 3/1984 | Koichi et al. | .................... | 204/164 |
| 4,565,670 A | 1/1986 | Miyazaki et al. | ......... | 422/186.04 |
| 4,631,380 A | 12/1986 | Tran | .............................. | 219/697 |
| 4,728,368 A | 3/1988 | Pedziwiatr | ...................... | 422/20 |
| 4,792,732 A | 12/1988 | O'Loughlin | ................. | 315/334 |
| 4,855,695 A | 8/1989 | Samardzija | ................... | 333/17.3 |
| 4,883,570 A | 11/1989 | Efthimion et al. | | |
| 4,913,928 A | 4/1990 | Sugita et al. | ..................... | 427/39 |
| 4,922,180 A | 5/1990 | Saffer et al. | .................... | 324/639 |
| 4,934,561 A | 6/1990 | Ness et al. | ........................ | 222/1 |
| 4,957,606 A | 9/1990 | Juvan | | |
| 4,968,403 A | 11/1990 | Herbst et al. | .................. | 208/113 |
| 5,063,329 A | 11/1991 | Okamoto | ................. | 315/111.21 |
| 5,079,507 A | 1/1992 | Ishida et al. | .................. | 333/17.3 |
| 5,114,684 A | 5/1992 | Walker | ............................ | 422/21 |
| 5,200,043 A | 4/1993 | Ooe et al. | ....................... | 205/763 |
| 5,262,610 A | 11/1993 | Huang et al. | ............. | 219/121.43 |
| 5,273,609 A | 12/1993 | Moslehi | ......................... | 156/345 |
| 5,279,669 A | 1/1994 | Lee | ................................ | 118/723 |
| 5,349,154 A | 9/1994 | Harker et al. | ................. | 117/102 |
| 5,362,451 A | 11/1994 | Cha | ............................. | 422/186.3 |
| 5,389,153 A | 2/1995 | Paranjpe et al. | ............. | 118/723 |
| 5,447,052 A | 9/1995 | Delaune et al. | .............. | 73/19.09 |
| 5,471,037 A | 11/1995 | Goethel et al. | ................ | 219/750 |
| 5,507,927 A | 4/1996 | Emery | ...................... | 204/157.43 |
| 5,521,605 A | 5/1996 | Koike | ........................... | 343/702 |
| 5,539,209 A | 7/1996 | Maarschalkerweerd | ........ | 422/24 |
| 5,540,886 A | 7/1996 | Warmbier et al. | .............. | 422/21 |
| 5,770,982 A | 6/1998 | Moore | ........................... | 333/32 |
| 5,834,744 A | 11/1998 | Risman | ......................... | 219/697 |
| 5,902,404 A | 5/1999 | Fong et al. | .................... | 118/723 |
| 5,907,221 A | 5/1999 | Sato et al. | ................. | 315/111.21 |
| 5,911,885 A | 6/1999 | Owens | ............................ | 204/155 |
| 5,914,014 A | 6/1999 | Kartchner | ................ | 204/157.15 |
| 5,929,570 A | 7/1999 | Shinohara et al. | ........ | 315/111.21 |
| 6,027,686 A | 2/2000 | Cha | ............................. | 422/186 |
| 6,040,547 A | 3/2000 | Antonova et al. | ........ | 219/121.43 |
| 6,057,645 A | 5/2000 | Srivastava et al. | ........ | 315/111.21 |
| 6,077,400 A | 6/2000 | Kartchner | ................ | 204/157.15 |
| 6,187,206 B1 | 2/2001 | Bernier et al. | ................ | 210/721 |
| 6,187,988 B1 | 2/2001 | Cha | ............................. | 588/227 |
| 6,192,318 B1 | 2/2001 | Yogo et al. | .................... | 333/17.3 |
| 6,193,878 B1 | 2/2001 | Morse et al. | ................... | 422/186 |
| 6,207,023 B1 | 3/2001 | Cha | ............................ | 204/157.3 |
| 6,259,334 B1 | 7/2001 | Howald | ....................... | 333/17.3 |
| 6,261,525 B1 | 7/2001 | Minaee | ......................... | 422/186 |
| 6,409,975 B1 | 6/2002 | Seyed-Yagoobi et al. | .... | 422/186 |
| 6,419,799 B1 | 7/2002 | Cha | ............................ | 204/157.3 |
| 6,572,737 B2 | 6/2003 | Dalton | .................... | 204/157.15 |
| 6,576,127 B1 | 6/2003 | Ohkawa | ........................ | 210/222 |
| 6,592,723 B2 | 7/2003 | Cha | ............................ | 204/157.52 |
| 6,605,750 B1 | 8/2003 | Bessho et al. | ................ | 588/212 |
| 6,621,525 B1 | 9/2003 | Ueda et al. | ................... | 348/618 |
| 6,677,828 B1 | 1/2004 | Harnett et al. | ............... | 333/17.3 |
| 6,683,272 B2 | 1/2004 | Hammer | ................. | 219/121.48 |
| 6,686,557 B1 | 2/2004 | Chancey et al. | ......... | 219/121.51 |
| 6,689,252 B1 | 2/2004 | Shamouiloa et al. | .... | 204/157.15 |
| 6,693,253 B2 | 2/2004 | Boulos et al. | ............ | 219/121.52 |
| 6,696,662 B2 | 2/2004 | Jewett et al. | ............. | 219/121.48 |
| 6,740,858 B2 | 5/2004 | Tracy et al. | .................... | 422/186 |
| 6,783,633 B2 | 8/2004 | Babchin et al. | ................ | 204/164 |
| 6,809,310 B2 | 10/2004 | Chen | ............................. | 250/251 |
| 6,817,388 B2 | 11/2004 | Tsangaris et al. | ................ | 141/82 |
| 6,888,116 B2 | 5/2005 | Dalton | ......................... | 219/745 |
| 6,933,482 B2 | 8/2005 | Fagrell et al. | .................. | 219/695 |
| 6,960,747 B2 | 11/2005 | Risman | ......................... | 333/230 |
| 7,210,424 B2 | 5/2007 | Tolmachev et al. | ........... | 118/723 |
| 7,227,097 B2 | 6/2007 | Kumar et al. | ............. | 219/121.43 |
| 7,495,443 B2 | 2/2009 | Leussler et al. | ................ | 324/318 |
| 7,518,466 B2 | 4/2009 | Sorensen et al. | ............. | 333/17.3 |
| 7,629,497 B2 | 12/2009 | Pringle | ......................... | 585/241 |
| 2004/0074760 A1 | 4/2004 | Portnoff et al. | ........... | 204/157.15 |
| 2005/0106873 A1 | 5/2005 | Hoffman et al. | ............... | 438/689 |
| 2005/0155854 A1 | 7/2005 | Shufflebotham et al. | ...... | 204/164 |
| 2006/0060464 A1 | 3/2006 | Chang | ............................ | 204/164 |
| 2006/0073084 A1 | 4/2006 | Burkitbayev | ................. | 422/186 |
| 2006/0102622 A1 | 5/2006 | Gregoire et al. | .............. | 219/695 |
| 2007/0102279 A1 | 5/2007 | Novak | ......................... | 204/157.6 |
| 2007/0131591 A1 | 6/2007 | Pringle | ......................... | 208/402 |
| 2007/0240975 A1 | 10/2007 | Foret | ......................... | 204/157.15 |
| 2008/0202982 A1 | 8/2008 | Tooley | | |
| 2008/0233020 A1 | 9/2008 | Purta et al. | ..................... | 422/186 |
| 2009/0078559 A1 | 3/2009 | Proudkii et al. | ......... | 204/157.15 |
| 2009/0173619 A1* | 7/2009 | Banks | ........................ | 204/157.15 |
| 2009/0260973 A1 | 10/2009 | Proudkii et al. | ............... | 204/164 |

OTHER PUBLICATIONS

"Prediction of the Functional Properties of Ceramic Materials from Composition using Artificial Neural Networks." Journal of the European Ceramic Society. Scott et al. Feb. 6, 2008. pp. 1-24.
International Search Report issued in PCT/US2010/030930 dated. Jul. 1, 2010 (1 pg).
Extended European Search Report dated Nov. 8, 2010, (9 pgs).
Official Action dated Aug. 2, 2011 issued in U.S. Appl. No. 12/234,503 (25 pgs).
Official Action issued in corresponding CIP case, U.S. Appl. No. 12/420,770 dated May 19, 2011 (52 pgs).
Official Actions cited in U.S. Appl. No. 12/234,503 dated Feb. 4, 2011 and Sep. 29, 2010.
Partial European Search Report dated Feb. 7, 2010, (5 pgs).
PCT Search Report and Written Opinion, International Appln. No. PCT/US2011/028810 (RFT 09.02 PCT), dated Mar. 17, 2011, (10 pages).
U.S. Office Action dated Dec. 6, 2010 (41 pages).
International Preliminary Report on Patentability issued for application No. PCT/US2011/028810, dated Sep. 18, 2012 (7 pgs).
International Search Report and the Written Opinion issued for PCT/US2011/028810, dated May 20, 2011 (10 pgs).
Japanese Official Action, Appln. No. 2010-526053 (3 pgs).
US Official Action issued in corresponding U.S. Appl. No. 12/234,503 dated Dec. 7, 2011 (30 pgs).
International Preliminary Report on Patentability and Written Opinion, dated Oct. 18, 2011, Intl Appln. No. PCT/US2010/030930 (6 pgs).

* cited by examiner

METHOD AND APPARATUS FOR EXCITATION OF RESONANCES IN MOLECULES

CROSS REFERENCE TO RELATED APPLICATION

This application claims priority from U.S. Provisional Application Serial No. 61/169,227, filed Apr. 14, 2009, the contents of which are incorporated herein by reference.

This invention relates generally to processing or reaction of materials. The invention has particular utility in the use of electromagnetic energy at resonance frequencies of the material being reacted upon or processed to promote a chemical process or reaction, such as the breaking of chemical bonds in large molecules and will be described in connection with such utility, although other utilities are contemplated. An example of this is to break molecular bonds in long hydrocarbon chains so that shorter chain and lower weight hydrocarbons are created. Such a process could for example reduce heavy, viscous oil to a less viscous consistency so that it can be more easily transported through a pipe.

Petroleum-based materials are integral to the world's economy and demand for petroleum based fuels and petroleum based products is increasing. As the demand rises, there is a need to efficiently and economically process petroleum-based materials to fulfill that demand. As such, it would be advantageous to not only be able to process raw petroleum-based materials from the earth, but to recycle consumer products to recapture those petroleum-based materials.

Worldwide oil consumption is estimated at in excess of seventy million barrels per day and growing. Thus, there is a need for sufficient oil supplies. Tar sands, oil sands and oil shales, contain large quantities of oil; however, extraction of oil from these materials is costly and time-consuming.

Pumping heavy oil from oil sands is difficult. Typically, up to 30% by volume of a solvent or diluent must be added to such oil to make it thin enough to pump through pipelines. This adds a cost of as much as 15% to a barrel of oil at current prices. Thus, the ability to economically break some of the molecular bonds to make the oil less viscous could have a significant impact on the recovery of useful products from oil sands. Another problem that is becoming increasingly important is the disposal of toxic wastes. Generally to render wastes harmless requires breaking chemical bonds in the waste and possibly then adding other substances to form new bonds.

In prior art, it is known that a process or reaction volume can be excited in a resonant electromagnetic structure with an electromagnetic generator coupled to it. The structure is generally multimode (i.e., multi-spatial mode). A microwave oven is an example of such an apparatus.

The resonant structure also may be a single mode structure, wherein a single frequency is resonant in a single spatial mode. A single mode resonant structure is smaller than a multimode resonant structure and cannot handle as much power input. In many applications, it is desirable to create a plasma in a process or reaction volume, and it is generally easier in a single mode resonant structure to establish a stable plasma and to maintain matching to the generator and its delivery system.

It also is known that a reaction or process volume can be excited in a multimode resonant structure coupled to a plurality of electromagnetic generators. For example, U.S. Pat. No. 7,227,097 describes a system using multiple generators coupled to a common multimode resonant structure, with a plasma created in the common resonant cavity. This configuration has the advantage of permitting more input power, but the multimode cavity is far more sensitive to plasma fluctuations. Matching and maintaining the electromagnetic generators and their respective delivery systems also is difficult in this configuration. There also is more cross-coupling of the various generators through plasma instabilities. Prior art references also provide multiple generator inputs for a single mode resonant structure, but in the single mode configuration each generator would be required to have the same frequency and phase, and the resonant structure would limit how much power could be applied.

In many cases, it is necessary to use very high frequencies, for example microwaves. Generation of microwave energy (roughly 300 MHz to 300 GHz) from input electrical energy is typically only about 50 to 70% efficient. By comparison, generation of lower radio frequency (roughly 455 KHz to 300 MHz) energy conversion is up to 95% efficient.

In some processes or reactions, it becomes necessary to use microwave energy. For example, in many applications it is necessary to form a plasma using microwave frequencies, but it would be very advantageous to further heat the plasma using lower frequencies that can be generated more efficiently. Further, in a microwave resonant structure, generally the plasma is not uniformly heated along the length of a process or reaction chamber.

Accordingly, there is a need for an improved method and apparatus for treating a process volume with increased efficiency. Specifically, it is desirable to excite the plasma uniformly along the length of the reaction chamber and to utilize lower radio frequency energy conversion.

The present disclosure addresses the needs discussed above by utilizing excitation of molecules at various of their resonant frequencies to cause bonds to break or form. By exciting the molecules at a natural resonant frequency, it is possible to provide sufficient excitation to break a chemical bond.

Generally the resonant rotational frequencies of molecular bonds are in the radio frequency (RF) range (455 kHz to 300 MHz) or microwave frequency range that is from about 300 MHz to 300 GHz, spanning a wavelength range from about 150 meters to 1 millimeter. Generally these are vibrational modes of the molecule.

In the gaseous phase, these resonances are sharp and well defined. There are many tabulations of the microwave or RF resonant frequencies of rotational modes of molecules. If the molecules are in close proximity, as in a liquid or solid, these levels become much broader, but nevertheless there are still regions where absorption of electromagnetic radiation is increased.

In our co-pending U.S. application Ser. No. 12/420,770 filed Apr. 8, 2009, assigned to a common assignee and incorporated by reference herein, we provide a system, i.e. a method and apparatus for treating a process or reaction volume with multiple electromagnetic generators by applying the output of several electromagnetic generators to respective resonant structures, with the several resonant structures then coupled to a common process or reaction volume. The application further discloses methods for matching and tuning the electromagnetic generators to their respective resonant structures, for controlling the power input to each resonant structure, and for controlling the phase of any inputs that have the same resonant frequency. The various resonant structures are arranged such that the reaction or process volume is a part of each resonant structure. In this configuration, the generators can have different frequencies and phases, and still be matched to a common process or reaction volume. Only the process or reaction volume limits the amount of power that can be inputted. Thus, the system combines the advantages of multiple inputs and increased stability by having each generator coupled to its own resonant structure, wherein each resonant structure is in turn coupled to the common process or reaction volume.

Our previous disclosure also provide a method and apparatus to couple lower, radio frequency (RF) electromagnetic sources to the reaction and process volume in addition to the microwave sources. The disclosure further provide for a static magnetic field. In order to accomplish this, the process or reaction chamber is arranged such that several microwave modes are simultaneously resonant in the structure. This permits more even and greater excitation of the material being processed or reacted upon. The structure allows several microwave inputs of the same or different frequencies. The structure further provides electronic and mechanical tuning for matching of the microwave generators to the process or reaction chamber and allows rapid adjustment for maintaining matching to the load.

The present disclosure further provides a method and apparatus whereby molecules are excited with an intense microwave or RF electromagnetic field, such that enough energy is added to the molecules to overcome the bonding energy that holds them together. This disclosure also can be used to promote bond forming in chemical reactions.

The present disclosure uses particles (or drops) of the material to be processed or reacted upon to serve as dielectric resonators. Large electromagnetic fields building up in these small dielectric resonators will cause heating and eventual breakdown, breaking some bonds and scattering the material into the resonant chamber, whose resonant frequency coincides with the natural resonant frequency of the constituent molecules. There may be many species of material in the original dielectric resonators. The material may be passed through successive resonant structures to excite other resonant frequencies, or in some cases it may be possible to have several input frequencies to the resonant structure.

One aspect of the present disclosure provides a method for causing a reaction by exciting molecules with radio frequency or microwave electromagnetic energy at one or more frequencies tuned to the natural resonant frequencies of the molecules. The materials are prepared for processing by either atomizing or pulverizing to adequately dilute the material in order to absorb maximum amounts of energy. The material is then injected into a resonant structure, wherein the resonant structure supports electromagnetic fields at the natural resonant frequencies of the molecules of the material to be processed. Electromagnetic energy inputs are provided to the resonant structure at frequencies corresponding to natural resonances of the material to be processed. Finally, the products of the method are collected from the resonant structure to either be used or subjected to further processing.

Another aspect of the present disclosure provides a method as described above wherein a plurality of particles of the material to be processed each form dielectric resonators. The electromagnetic energy inputs are provided to the resonant structure at frequencies corresponding to natural resonances of the dielectric resonators.

Yet another aspect of the present disclosure provides a method as described above, wherein electromagnetic energy inputs are provided to the resonant structure at frequencies corresponding to natural resonances of the dielectric resonators and at frequencies corresponding to natural resonances of the molecules of the material to be processed.

Another aspect of the present disclosure is provided in the form of an apparatus for accomplishing the above-described methods, comprising: a reaction structure containing a process or reaction volume; and a plurality of electromagnetic generators coupled to the reaction structure.

Other features of the present disclosure provide for various frequencies of electromagnetic radiation chosen to selectively favor the production of a desired product. Further, additional static electromagnetic fields may be applied to orient polar molecules of the material to be processed in such a way as to optimize their interaction with the various applied electromagnetic fields.

Other systems, methods, features, and advantages of the present disclosure will be or become apparent upon examination of the following drawings and detailed description. The features, functions and advantages that have been discussed can be achieved independently in various embodiments of the present disclosure or may be combined in yet other embodiments further details of which can be seen with reference to the following description and drawings.

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Figure 2:
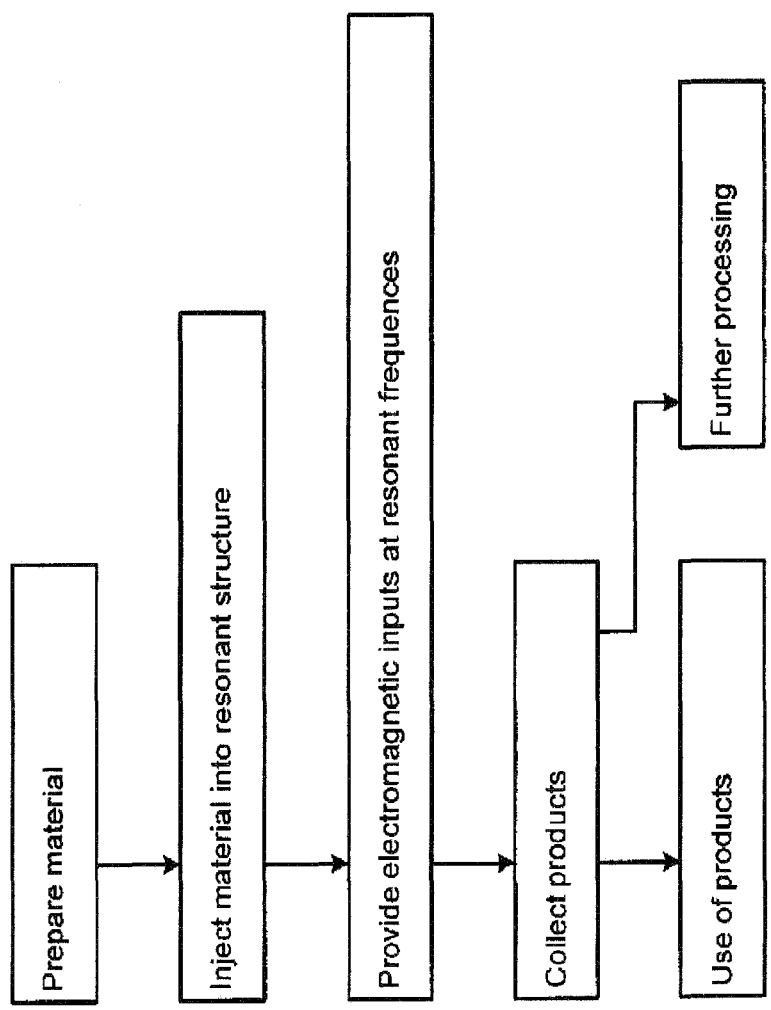

FIG. 1 is a schematic of an apparatus in accordance with the present disclosure; and FIG. 2 is a flowchart of a method for exciting resonances in molecules in accordance with the present disclosure.

In the following description, reference is made to the accompanying drawings, which form a part hereof, and in which is shown, by way of illustration, various embodiments of the present invention. It is understood that other embodiments may be utilized and changes may be made without departing from the scope of the present invention.

Molecules have many vibrational and rotational modes, with rotational resonant frequencies generally in the radio or microwave frequency range. For very large molecules, such as hydrocarbons that can have hundreds of atoms, there are generally many resonant frequencies available that are closely spaced. At high levels of excitation, and also in complex molecules with many atoms, the rotational and vibrational levels are coupled, resulting in many levels available to absorb radio or microwave frequency radiation. If sufficient energy is applied to a molecule at one or more of the resonant frequencies, more and more photons will be absorbed, increasing the level of excitation of the various resonances until ultimately a chemical bond will be broken, or in some cases a chemical bond may be formed.

The binding energies of molecules are generally of the order of one to several electron volts (ev). In order to break a chemical bond in a molecule, an equal amount of energy must be supplied to one of the resonant modes of the molecule. For example, if a reaction is to be caused by the absorption of a single photon, then the photon must have an energy of several electron volts. This amount of energy corresponds to light within the ultraviolet or visible spectrum. A laser, or similar electromagnetic energy source with an output in the desired wavelength region, would probably be required to bring about dissociation.

Since the efficiency of radio and microwave sources is much greater than lasers, it is desirable to be able to dissociate molecules or form bonds with these sources. Photons in this frequency range have far too little energy to cause dissociation or bond formation with a single photon. However, if one of the vibrational or rotational modes (or both) of the molecule can be excited by the absorption of multiple RF or microwave photons, a reaction may still take place. Where the RF or microwave source is tuned to resonance of one of the modes, then many quanta of the electromagnetic radiation can be absorbed because the probability of causing a transition from one energy level to a higher one increases at natural resonances of the molecule. Further, the probability of a transition also increases with the number of available photons (or alternatively, with the strength of the microwave field).

As discussed above, bond energies in a molecule are generally on the order of several electron volts. Microwave or RF photons contain approximately $1/100$ of the energy required, so a large number photons would need to be absorbed to break (or form) a chemical bond. There are two basic ways this can be accomplished with low energy photons such as these: multi-photon absorption between two energy levels by means of so-called virtual intermediate energy levels or repeated absorption of photons by real energy levels in the molecule. A combination of both of these processes is another viable option. Multi-photon absorption of infrared radiation by means of a laser has been demonstrated, and the dissociation of water by a microwave electromagnetic field has also been demonstrated. However, the microwave radiation was not at a natural resonant frequency of the water molecules.

It is a purpose of this disclosure to cause excitation and dissociation or bond forming by using intense microwave or RF fields in a mechanical resonant structure, wherein the structure is resonant at multiple frequencies, and wherein these resonant frequencies also coincide with resonant frequencies within the molecules to cause bond breaking or forming.

As stated above, enough energy must be added to a molecule to cause breaking of various chemical bonds (or also formation of various bonds). In order to achieve this, it is desirable in some cases to use other methods to also increase the energy of the molecule. This has been done for example by forming a plasma where collisions of electrons and other particles can add energy.

A further part of this disclosure is to add energy by forming the molecules to be acted upon into small particles or drops of appropriate shapes of uniform size, and then use these particles or drops as dielectric resonators. A particle or drop in fact forms a dielectric resonator with a well defined resonant frequency. If the particles or drops are injected into a mechanical resonant structure with very large electromagnetic fields at the natural resonant frequencies of the particles or drops, very large electromagnetic fields will be built up inside these small dielectric resonators. These resonant frequencies generally will be in the microwave frequency range. These intense fields will cause rupture of the dielectric resonators, scattering fragments of the rupture into the mechanical resonant structure. These fragments will include excited molecules, fragments of the original molecules due to bond breaking, smaller bits of the original material, and in the event of other substances deliberately added inside the mechanical resonant structure, new molecules, where fragments of the original molecules have combined with the other substances introduced into the chamber. We have observed such a process in a reaction cell constructed in accordance with the apparatus disclosed in our co-pending U.S. application Ser. No. 12/234,503 filed Sep. 19, 2008, assigned to a common assignee and incorporated by reference herein. In that case, hydrogenation of hydrocarbon molecules was observed due to the presence of water in the reaction cell.

Once the dielectric resonators have ruptured, the products can be acted upon by intense resonant electromagnetic fields of the proper frequencies to cause selective excitation of the various products from the rupture of the dielectric resonators, in order to add still more excitation to the molecules ultimately to achieve bond breaking or bond formation.

It is a purpose of this disclosure to provide intense microwave or RF electromagnetic radiation at frequencies exactly coinciding with natural molecular resonances of molecules of a substance to cause either dissociation or bond forming. This will involve injecting the substance to be reacted upon or processed into a structure that is resonant at the RF and/or microwave frequencies. Generally the substance will be in a dilute form so that the resonances of the molecules which comprise the substance are heightened, although as explained previously, even in condensed form molecules retain resonant features, although not as sharp as in dilute form.

In sum, molecules are excited by three resonant processes. First, the electromagnetic fields are enhanced by being in a mechanical structure that is resonant at the RF or microwave frequency. Secondly, this resonant frequency is chosen to coincide with one or more of the natural resonant frequencies of the constituent molecules. Additionally, as explained previously, the molecules of the substance can be formed into dielectric resonators to further add energy.

More than one species of molecules can be acted on at once by appropriately choosing multiple resonant frequencies, and other materials can be added to promote bond breaking or bond formation. Catalysts or particles of other substances also can be added to promote bond breaking, bond forming, and/or energy transfer to the molecules (for example small metal particles to act as "seeds" for drop formation FIG. 1 shows one embodiment of this disclosure. In this case, we have chosen a liquid as an input to the process. The liquid is atomized into a fine mist and injected into a resonant structure whose resonant frequency coincides with one of the natural resonant frequencies of the molecules that comprise the liquid. In this case, it is desirable to break some of the chemical bonds of the molecules. This would be done, for example, to break complex heavy hydrocarbon molecules, such as occur in heavy petroleum, into other shorter molecules. This would be done to make other products or synthesize new ones. One other application of this is to make the oil less viscous so that it can be pumped through a pipe.

FIG. 1 displays a liquid 1 which is shown for illustrative purposes, but a solid or a gas alternatively could be used, with appropriate modifications to the apparatus. The liquid is pumped by a pump 2 through an atomizer 3 to create liquid droplets 4. Element 5 is a resonant structure with high microwave and possibly also RF electromagnetic fields. Generators 6, 7, 8, and 9 in this illustration are shown as microwave sources, coupled to the resonant structure by a coupling device, such as a waveguide or a coaxial cable 10,11,12,13, and appropriate impedance matching devices 14,15,16,17. The generators 6,7,8,9 may be the same or different frequencies. There also may be more or less than four generators. Lower frequency RF sources 18, 19 are for adding more power into the resonant structure. The resonant structure 5 can be constructed so that parts of it form an inductor that can be resonant with an appropriate capacitance, shown schematically by 20 and 21 in the figure. The capacitance can also be a part of the resonant structure, so that separate capacitors are not needed. A technique for making the structure resonant at these lower frequencies is disclosed in the afore-mentioned, commonly owned applications. A static magnetic or electric field also can be added to the resonant structure to confine a plasma if one is generated or to align polar molecules for more efficient absorption of electromagnetic radiation. This is shown schematically as a DC source 22.

It is to be understood that the disclosure is not limited to the generators shown. Additional generators can be used for more power where appropriate. Systems for matching multiple generators of different frequencies to the same load are disclosed in the afore-mentioned, commonly owned applications.

The input liquid is atomized into spheres by an atomizer 3. The spherical drops 4 are in fact dielectric resonators, and if one of the input frequencies is chosen properly, very high electromagnetic fields can be built up inside the droplets, leading to very high levels of excitation of the molecules in the droplet. When the energy reaches a certain point, this can cause a "spark" to occur, breaking the molecular bonds and scattering molecules into the resonant chamber, where another electromagnetic field whose frequency has been chosen to be at one of the molecule's natural frequencies will further excite that resonance. This can be used either to break a bond or to facilitate a chemical reaction (such as form new bonds). In the latter case, another substance would also be injected into the resonant structure to combine with the excited molecules or atoms.

Products 24 from the reaction or process are collected at the output of the apparatus. The entire resonant structure is contained in an electromagnetic shield to prevent radiation into the environment.

FIG. 2 illustrates the method of the present disclosure. A material is prepared and injected into a resonant structure. Electromagnetic energy is provided at resonant frequencies of the prepared material, causing a reaction of the material in the form of breaking molecular bonds and/or forming new chemical bonds with other materials present in the resonant structure. The products of the reaction are then collected, wherein some products may be useful for other processes and other products may require further processing.

The radio frequencies are typically in the RF range (455 kHz to 300 MHz) and/or microwave range (300 MHz to 300 GHz). The material may be prepared, for example, by atomizing a liquid prior to injecting into the resonant structure. Alternatively, the material may be a solid that has been pulverized into a plurality of small particles, wherein some of the particles may be spherical. The input material also could be a gas, or a combination of any of the materials discussed herein. A catalyst also may be injected into the resonant structure to facilitate a reaction or to react with the prepared materials to form new materials.

It should be emphasized that the above-described embodiments of the present disclosure, particularly, any "preferred" embodiments, are merely possible examples of implementations, merely set forth for a clear understanding of the principles of the present disclosure. Many variations and modifications may be made to the above-described embodiments without departing substantially from the spirit and principles of the disclosure. All such modifications and variations are intended to be included herein within the scope of this disclosure and protected by the following claims.

What is claimed is:

1. A method for causing a reaction by exciting molecules with radio frequency or microwave electromagnetic energy at one or more frequencies tuned to the natural resonant frequencies of the molecules, comprising the steps of:
   providing a material to be processed;
   injecting the material to be processed into a resonant structure, wherein the resonant structure supports electromagnetic fields at the natural resonant frequencies of the molecules of the material to be processed;
   providing electromagnetic energy inputs to the resonant structure at frequencies corresponding to natural resonances of the material to be processed;
   applying an additional static electromagnetic field to the resonant structure to orient polar molecules of the material to be processed in such a way as to optimize their interaction with the various applied electromagnetic fields; and
   collecting the products of the method from the resonant structure.

2. The method of claim 1, wherein the electromagnetic energy inputs are in the range of radio frequencies and microwave frequencies.

3. The method of claim 1, wherein the material to be processed is selected from the group consisting of: a liquid; a solid; a gas; and a combination of a liquid, a solid and a gas.

4. The method of claim 3, wherein the material to be processed is a liquid, and including a step of preparing the material to be processed by atomizing the liquid, or the material to be processed is a solid, and including a step of preparing the material to be processed by pulverizing the solid into small particles for injection into the resonant structure.

5. The method of claim 4, wherein some of the particles are substantially spherical.

6. The method of claim 3, wherein the material to be processed is a combination of a liquid, a solid and a gas, and including a step of preparing the material to be processed by atomizing the liquid and pulverizing the solid.

7. The method of claim 1, further comprising supplying a catalyst into the resonant structure to facilitate a reaction.

8. The method of claim 1, wherein other substances are injected into the resonant structure to form other products by reacting with the material to be processed, wherein the other substances include water.

9. The method of claim 8, wherein water supplied into the resonant structure is dissociated, whereupon hydrogen from the water combines with some of the byproducts of dissociation of the molecules of the material to be processed.

10. The method of claim 8, wherein the material to be reacted upon is a liquid and wherein the other substances include metal particles, wherein the metal particles are surrounded by drops of the liquid and cause a spark within the liquid drops.

11. The method of claim 1, wherein the various frequencies of electromagnetic radiation are chosen to selectively favor the production of a desired product.

12. A method for causing a reaction by exciting dielectric resonators with radio frequency or microwave electromagnetic energy at one or more frequencies, comprising the steps of:
   providing a material to be processed, wherein a plurality of particles of the material to be processed each form dielectric resonators;
   injecting the material to be processed into a resonant structure;
   providing electromagnetic energy inputs to the resonant structure at frequencies corresponding to natural resonances of the dielectric resonators;
   applying an additional static electromagnetic field to orient polar molecules of the material to be processed in such a way as to optimize their interaction with the various applied electromagnetic fields; and
   collecting the products of the method from the resonant structure.

13. The method of claim 12, wherein the electromagnetic energy inputs are in the range of radio frequencies and microwave frequencies.

14. The method of claim 12, wherein the material to be processed is selected from the group consisting of: a liquid; a solid; a gas; and a combination of a liquid, a solid and a gas, or the material to be processed is a liquid, and including a step of preparing the material to be processed by atomizing the liquid.

15. The method of claim 14, wherein the material to be processed is a solid, and including a step of preparing the material to be processed by pulverizing the solid into small particles for injection into the resonant structure, wherein some of the particles preferably are substantially spherical.

16. The method of claim 14, wherein the material to be processed is a combination of a liquid, a solid and a gas, and including a step of preparing the material to be processed by atomizing the liquid and pulverizing the solid.

17. The method of claim 12, further comprising supplying a catalyst into the resonant structure to facilitate a reaction.

18. The method of claim 12, wherein other substances are injected into the resonant structure to form other products by reacting with the material to be processed, and wherein the other substances include water, and wherein water supplied into the resonant structure is dissociated, whereupon hydrogen from the water combines with some of the byproducts of dissociation of the molecules of the material to be processed.

19. The method of claim 12, wherein the various frequencies of electromagnetic radiation are chosen to selectively favor the production of a desired product.

20. A method for causing a reaction by exciting molecules with radio frequency or microwave electromagnetic energy at one or more frequencies, comprising the steps of:
 providing a material to be processed, wherein a plurality of particles of the material to be processed each form dielectric resonators;
 injecting the material to be processed into a resonant structure;
 providing electromagnetic energy inputs to the resonant structure at frequencies corresponding to natural resonances of the dielectric resonators;
 providing additional electromagnetic energy inputs to the resonant structure at frequencies corresponding to natural resonances of the molecules of the material to be processed;
 applying an additional static electromagnetic field to orient polar molecules of the material to be processed in such a way as to optimize their interaction with the various applied electromagnetic fields; and
 collecting the products of the method from the resonant structure.

21. The method of claim 20, wherein the electromagnetic energy inputs are in the range of radio frequencies and microwave frequencies.

22. The method of claim 20, wherein the material to be processed is selected from the group consisting of: a liquid; a solid; a gas; and a combination of a liquid, a solid and a gas, and optionally further comprising supplying a catalyst into the resonant structure to facilitate a reaction.

23. The method of claim 20, wherein other substances are injected into the resonant structure to form other products by reacting with the material to be processed.

24. The method of claim 20, wherein the various frequencies of electromagnetic radiation are chosen to selectively favor the production of a desired product.

25. A method for causing a reaction by exciting molecules with radio frequency or microwave electromagnetic energy at one or more frequencies tuned to the natural resonant frequencies of the molecules, comprising the steps of:
 providing a material to be processed, wherein the material is a liquid;
 injecting the material to be processed into a resonant structure, wherein the resonant structure supports electromagnetic fields at the natural resonant frequencies of the molecules of the material to be processed;
 injecting other substances into the resonant structure to form other products by reacting with the material to be processed, wherein the other substances include water and metal particles;
 providing electromagnetic energy inputs to the resonant structure at frequencies corresponding to natural resonances of the material to be processed; and
 collecting the products of the method from the resonant structure.

26. The method of claim 25, where said metal particles are surrounded by drops of the liquid and cause a spark within the liquid drops.

* * * * *